US008856640B1

(12) United States Patent
Barr et al.

(10) Patent No.: US 8,856,640 B1
(45) Date of Patent: Oct. 7, 2014

(54) METHOD AND APPARATUS FOR APPLYING REVISION SPECIFIC ELECTRONIC SIGNATURES TO AN ELECTRONICALLY STORED DOCUMENT

(75) Inventors: John Mathias Barr, Ontario (CA); Geon Hyuk Park, Ontario (CA); Somit Gupta, Seattle, WA (US)

(73) Assignee: Google Inc., Mountain View, CA (US)

( * ) Notice: Subject to any disclaimer, the term of this patent is extended or adjusted under 35 U.S.C. 154(b) by 334 days.

(21) Appl. No.: 13/396,069

(22) Filed: Feb. 14, 2012

Related U.S. Application Data (63) Continuation of application No. 13/355,098, filed on Jan. 20, 2012, now abandoned.

(51) Int. Cl.
*G06F 17/20* (2006.01)
*H04L 29/06* (2006.01)

(52) U.S. Cl.
USPC ........... 715/229; 715/255; 715/809; 713/158; 713/176

(58) Field of Classification Search
USPC ......... 715/200, 202, 205, 226, 229, 255, 256, 715/700, 731, 764, 765, 234, 273, 762, 809, 715/810, 825, 828; 713/158, 161, 176
See application file for complete search history.

(56) References Cited

U.S. PATENT DOCUMENTS

| | | | | |
|---|---|---|---|---|
| 7,103,835 B1* | 9/2006 | Yankovich et al. | ........... | 715/234 |
| 7,353,397 B1* | 4/2008 | Herbach | ........ | 713/176 |
| 7,685,516 B2* | 3/2010 | Fischer | .......... | 715/255 |
| 8,020,003 B2* | 9/2011 | Fischer | .......... | 715/255 |
| 8,572,388 B2* | 10/2013 | Boemker et al. | .............. | 713/176 |
| 8,621,222 B1* | 12/2013 | Das | ............... | 713/176 |
| 2002/0029337 A1* | 3/2002 | Sudia et al. | ................... | 713/176 |
| 2005/0044369 A1* | 2/2005 | Anantharaman | ............ | 713/176 |
| 2005/0210256 A1* | 9/2005 | Meier et al. | .................... | 713/176 |
| 2007/0220259 A1* | 9/2007 | Pavlicic | ......... | 713/176 |
| 2008/0034213 A1* | 2/2008 | Boemker et al. | .............. | 713/176 |
| 2009/0204818 A1* | 8/2009 | Shin et al. | ..................... | 713/176 |
| 2010/0100743 A1* | 4/2010 | Ali et al. | ....................... | 713/176 |
| 2012/0284602 A1* | 11/2012 | Seed et al. | ................... | 715/224 |
| 2014/0032913 A1* | 1/2014 | Tenenboym et al. | ......... | 713/176 |

OTHER PUBLICATIONS

Pinkas et al. "CMS Advanced Electronic Signatures (CAdES)", Request for Comments 5126, Feb. 2008, 142 pages.*
"Electronic Signatures and Infrastructures (ESI); PDF Advanced Electronic Signature Profiles; Part 4: PAdES Long Term—PAdES-LTV Profile", ETSI TS 102 778-4, V1.1.1, Jul. 2009, 19 pgs.*

\* cited by examiner

*Primary Examiner* — Maikhanh Nguyen
(74) *Attorney, Agent, or Firm* — Young Basile Hanlon & MacFarlane P.C.

(57) ABSTRACT

Aspects of the present disclosure are directed to methods and systems for applying electronic signatures to an electronically stored document wherein the electronic signatures are associated with a specific revision of that electronically stored document (revision specific electronic signatures).

12 Claims, 9 Drawing Sheets

METHOD AND APPARATUS FOR APPLYING REVISION SPECIFIC ELECTRONIC SIGNATURES TO AN ELECTRONICALLY STORED DOCUMENT

CROSS-REFERENCE TO RELATED APPLICATIONS

This application is a continuation application of U.S. application Ser. No. 13/355,098, entitled "METHOD AND APPARATUS FOR APPLYING REVISION SPECIFIC ELECTRONIC SIGNATURES TO AN ELECTRONICALLY STORED DOCUMENT," filed on Jan. 20, 2012, the disclosure of which is incorporated herein by reference.

TECHNICAL FIELD

This disclosure relates generally to electronically stored documents and in particular to methods and apparatus that provide revision specific electronic signatures to electronically stored documents.

BACKGROUND

Generally, an electronic signature when applied to an electronically stored document is an indication that a person who applied the electronic signature approves of or otherwise adopts the document. It is, in other words, electronic data that carries the intent of a signature. As such, electronic signatures may provide verification to recipients of the document that the content has not been altered (Integrity), that the document is coming from a trusted or known person (Authentication), and/or that the individual who has applied the electronic signature cannot deny the signature (Non-repudiation).

SUMMARY

Briefly, aspects of the present disclosure are directed to methods and systems for applying electronic signatures to an electronically stored document wherein the electronic signatures are associated with a specific revision of that electronically stored document.

As used herein, an electronic signature is an electronic sound, symbol, or process attached to or logically associated with an electronically stored document that is executed, approved or otherwise adopted by the applier of the electronic signature. The term "electronic" means relating to technology having electrical, digital, magnetic, wireless, optical, electromagnetic or similar capabilities. A digital signature is but one type of electronic signature.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect". The aspects described above and other aspects of the present disclosure described herein are illustrated by way of example(s) and not limited in the accompanying drawing.

BRIEF DESCRIPTION OF THE DRAWING

A more complete understanding of the present disclosure may be realized by reference to the accompanying drawing in which:

FIG. 6($a$) is a schematic diagram depicting several revision specific electronic signatures as applied to an electronically stored document according to an aspect of the present disclosure;

FIG. 6($b$) is a schematic diagram depicting a revision history table for the electronically stored document of FIG. 6($a$);

The illustrative embodiments are described more fully by the Figures and detailed description. The inventions may, however, be embodied in various forms and are not limited to specific embodiments described in the Figures and detailed description

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative blocks or elements embodying the principles of the disclosure. Similarly, it will be appreciated that any flow charts, flow diagrams, state transition diagrams, pseudocode, and the like represent various processes which may be substantially represented in a computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and nonvolatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

It is noted that an electronic signature generally refers to a mark or other indicia of some sort that is imputed into an electronically stored document through electronic means. As may be readily appreciated by those skilled in the art, an electronically stored document is any electronic media that may be used in either an electronic form or as a printed output. Electronically stored documents may be associated with—for example—word processing, spreadsheets, presentation graphics, technical or architectural drawings or plain text— among others. Electronically stored documents may exhibit any of a number of known formats.

Oftentimes, a digital signature is used to implement an electronic signature. Digital signatures advantageously employ a type of cryptography and when properly implemented provide added assurances of provenance, identity and status of an electronically stored document as well as acknowledging informed consent and approval by a signatory.

Figure 1:
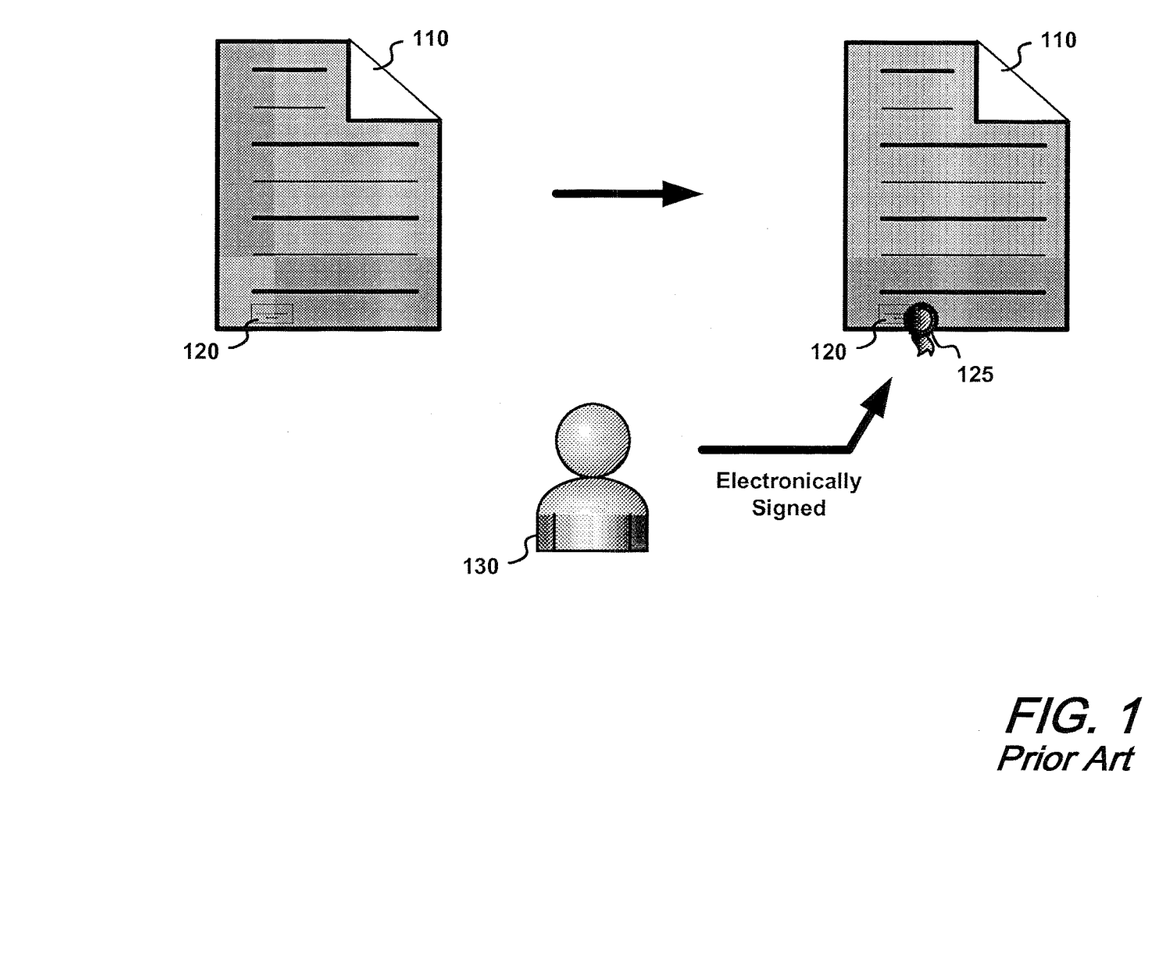
FIG. 1 is schematic diagram depicting a prior art application of an electronic signature to an electronically stored document.

With reference to FIG. 1, there is shown a schematic diagram depicting a prior art method for affixing an electronic signature to an electronically stored document. As depicted therein, an electronically stored document 110 is shown having a signature line 120 for signing by an individual signor 130.

Generally, a signature line 120 in an electronically stored document looks like a signature placeholder that may appear in a printed document, but operates differently. When a signature line 120 is placed in an electronically stored document, an individual 130 may then apply his/her electronic signature to the signature line 120 to electronically sign the document.

As may be readily appreciated, the electronic signature may be applied to the signature line 120 in any of a number of ways. For example, the individual 130 may simply click on the signature line with a mouse or other input device and then use a keyboard or other input device to type a signature. Alternatively, the individual 130 may select and apply a digital image of his/her signature or another alternative indicia.

Still further, the individual 130 may actually sign the signature with a pen/tablet/touch input device (not specifically shown).

Advantageously, an electronic signature may be visible, invisible or a combination of visible/invisible. Additionally, an electronic signature may include a cryptographic digital signature component as well. For the purposes of this description, any electronic signatures shown in the Figures are depicted as a "ribbon" or "certificate" 125 and is generally indicative of an electronic signature of any type described herein.

According to the prior art, once an electronically stored document is electronically signed, it is read-only such that subsequent modification to the electronically stored document is prevented.

Figure 2:
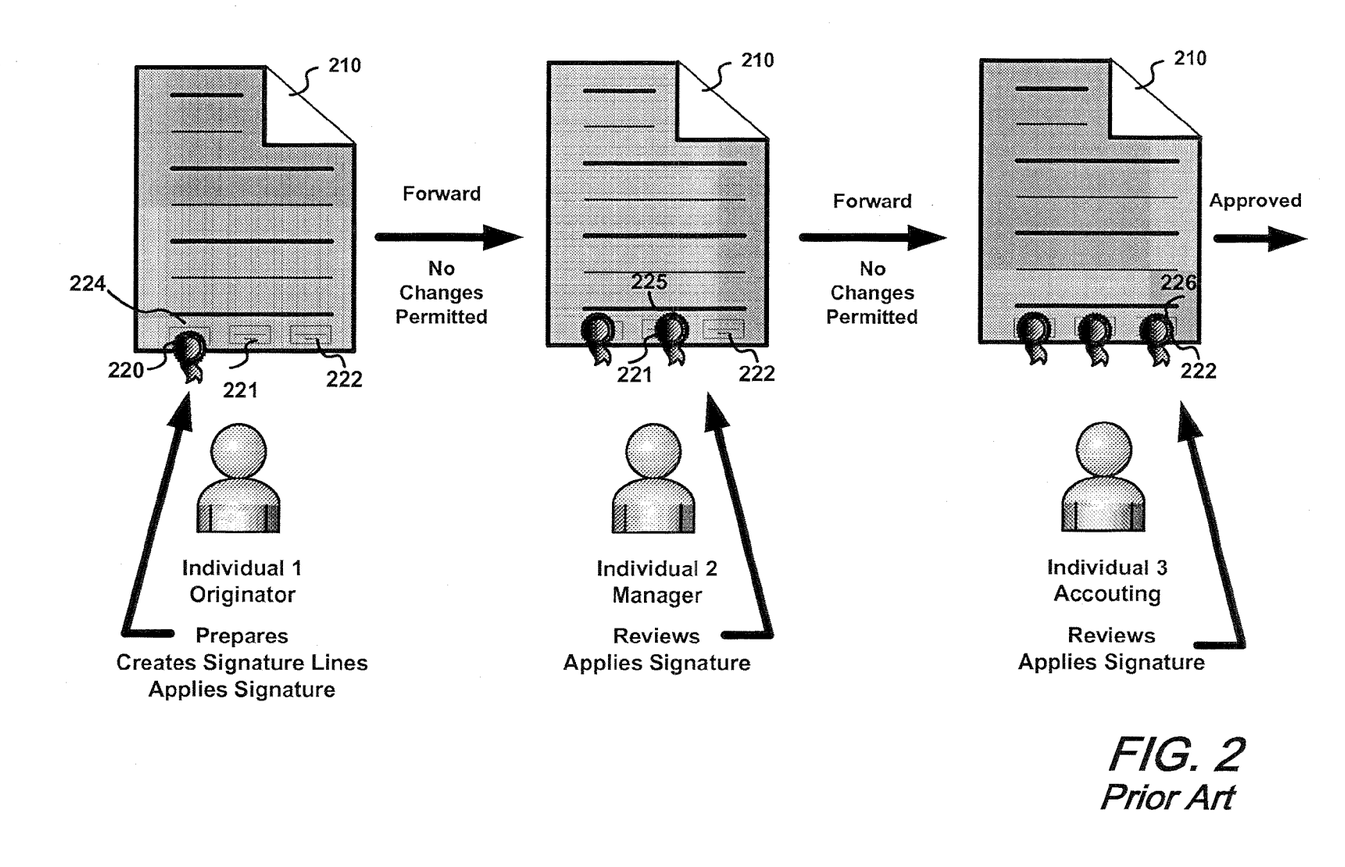
FIG. 2 is a schematic diagram depicting a prior art application of multiple electronic signatures to an electronically stored document.

Turning now to FIG. 2, there is shown a schematic diagram depicting a prior art method for applying multiple electronic signatures to an electronically stored document. As depicted therein, an electronically stored document 210 is shown having a number of signature lines 220, 221, 222 for signing by a number of individual signers.

As may be readily appreciated, an electronically stored document 210 such as that depicted in FIG. 2 may be, for example, an expense report spreadsheet prepared by Individual 1. In this exemplary scenario depicted in FIG. 2, Individual 1 prepares the electronically stored document (i.e., expense report) and in so doing creates three separate signature lines 220, 221, and 222 in the electronically stored document 210 namely, one for herself, one for her manager, Individual 2, and one for an accounting person, Individual 3.

Operationally, the signature lines 220, 221, and 222 are indicative that Individual 1 originated the electronically stored document 210, and that no changes will occur in this electronically stored document 210 as it moves to her manager, Individual 2 and subsequently to the accounting person, Individual 3. Additionally, such signature lines 220, 221, 223 are used to verify that both the manager Individual 2 and the accounting person Individual 3 have received and reviewed the electronically stored document 210.

Accordingly, after Individual 1 originates the electronically stored document 210 and applies her electronic signature 224, she forwards it to her manager, Individual 2. Once the manager Individual 2 receives the electronically stored document 210, she adds her electronic signature 225 to the document confirming that she has reviewed it and approved it. She then forwards the electronically stored document 210 to the accounting person Individual 3 for electronic signature and payment. The accounting person Individual 3 receives the document and electronically signs it with her electronic signature 226, which confirms her receipt and approval and authorizes its payment.

As may be appreciated from this exemplary scenario depicted in FIG. 2, multiple electronic signatures applied to a single electronic document have great utility. As noted previously however, changes or revisions to the document are generally not permitted after that electronic signature 224 of Individual 1 is applied to the electronically stored document 220.

As may be further appreciated by those skilled in the art, contemporary preparation of electronically stored documents may involve the collaboration of or coauthoring with, of a number of people. This is particularly true for the preparation of an electronically stored document in a networked or cloud environment. Accordingly, such an electronically stored document may proceed through a number of revisions (or versions), and in particular if that electronically stored document is modified by multiple collaborators or coauthors.

Revisioning, or versioning, is a known management technique for an electronically stored document that is changed over time. It is particularly useful in those situations in which a number of different persons or teams may make changes to the electronically stored document. Frequently, it is used with respect to word processing as well as computer software source code version control programs.

Operationally, changes made to an electronically stored document when revisioning is employed are oftentimes identified by a number or letter code, termed the "revision number", "revision level" or simply "revision". For example an initial electronically stored document (or a set of files) may be designated "revision 1". When a first change (or set of changes) is made to that initial electronically stored document, the resulting document may be designated as "revision 2", and so on. Those skilled in the art will appreciate that while the initial electronically stored document has been referred to as "revision 1", it should be readily apparent that it could have been referred to as "revision 0", or "revision A", etc., and any subsequent revision designations incremented and/or updated accordingly.

In the context of electronic signatures as described previously, it is noted that subsequent revisions to an electronically signed, electronically stored document are not generally permitted in the prior art once an initial electronic signature is applied to the electronically stored document.

With these general principles in place, we may now provide some non-limiting, illustrative examples that illustrate several operational aspects of various alternative embodiments of the present disclosure wherein revision-specific electronic signatures are applied to electronically stored documents.

Example 1

Figure 3:
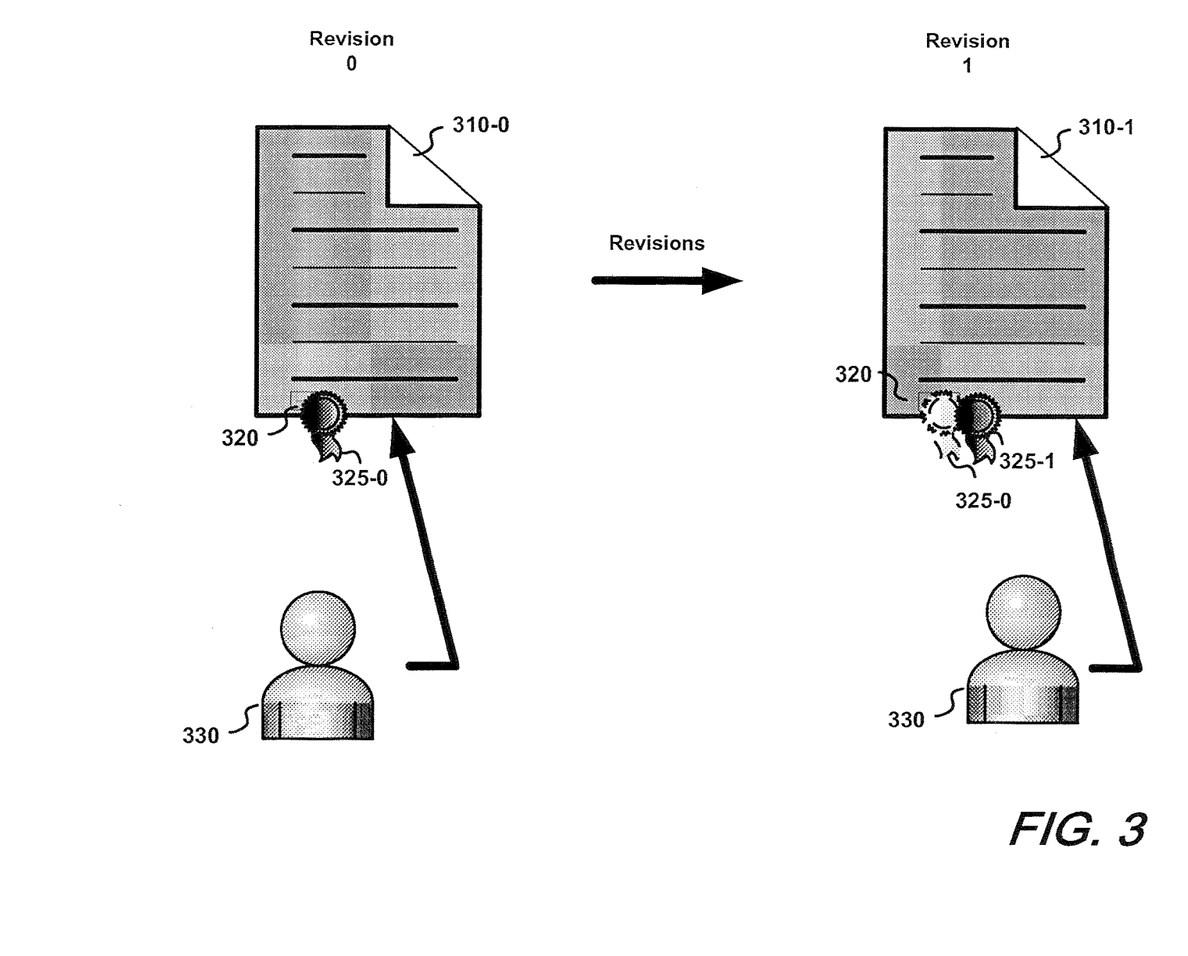
FIG. 3 is schematic diagram depicting the application of a revision specific electronic signature to an electronically stored document according to an aspect of the present disclosure.

With reference to FIG. 3, there is shown a schematic diagram depicting the application of a revision specific electronic signature to an electronically stored document according to an aspect of the present disclosure. As shown therein, an electronically stored document 310-0 is depicted as being prepared by, and having a signature line 320 for signing by an individual 330.

In this example shown in FIG. 3, the individual 330 prepares the electronically stored document 310-0 at revision 0, and applies his electronic signature 325-0 to the signature line 320.

Recognizing that a number of changes must be made to the electronically stored document 310-0 after applying his electronic signature 325-0, the individual 330 makes changes to the electronically stored document 310-0 such that a revision 1 of the document 310-1 is produced.

As may be readily appreciated by those skilled in the art, the electronic signature 325-0 applied to revision 0 of the electronically stored document 310-0 is not applicable to the changes that resulted in this revision 1 of the electronically stored document 310-1. According to an aspect of the present disclosure however, the individual may apply another electronic signature 325-1 to this revision 1 of the electronically stored document 310-1 such that it too is electronically executed/signed. In that regard, electronic signature 325-1 applied to this revision 1 of the electronically stored document 310-1 is revision specific. More particularly, electronic signature 325-1 is specific to this revision 1 electronically stored document 310-1. Similarly, electronic signature 325-0 is specific to revision 0 electronically stored document 325-0.

As may be further appreciated by those skilled in the art, each individual revision of an electronically stored document such as those illustratively depicted in FIG. 3 may be associated with a timestamp and an identification of a person making changes. Persons making the change(s) may then advantageously apply a revision specific electronic signature to the electronically stored document. Revisions may then be advantageously compared, restored or even merged with one another and the revision specific electronic signatures are maintained with respect to the particular revision.

It is noted that a variety of mechanisms may be employed to indicate to an individual who is revising a particular electronically-stored document any status associated with a particular electronic signature. For example, moving a cursor or other visual indicator over a particular signature may result in a "pop-up" or "balloon" or "callout" which indicates any revision of the electronically stored document to which the electronic signature is applicable. Additionally, an electronic signature that is applicable to an earlier revision of an electronically stored document but not a current revision may be "greyed" or otherwise visually indicative of its revision specificity.

Example 2

Figure 4:
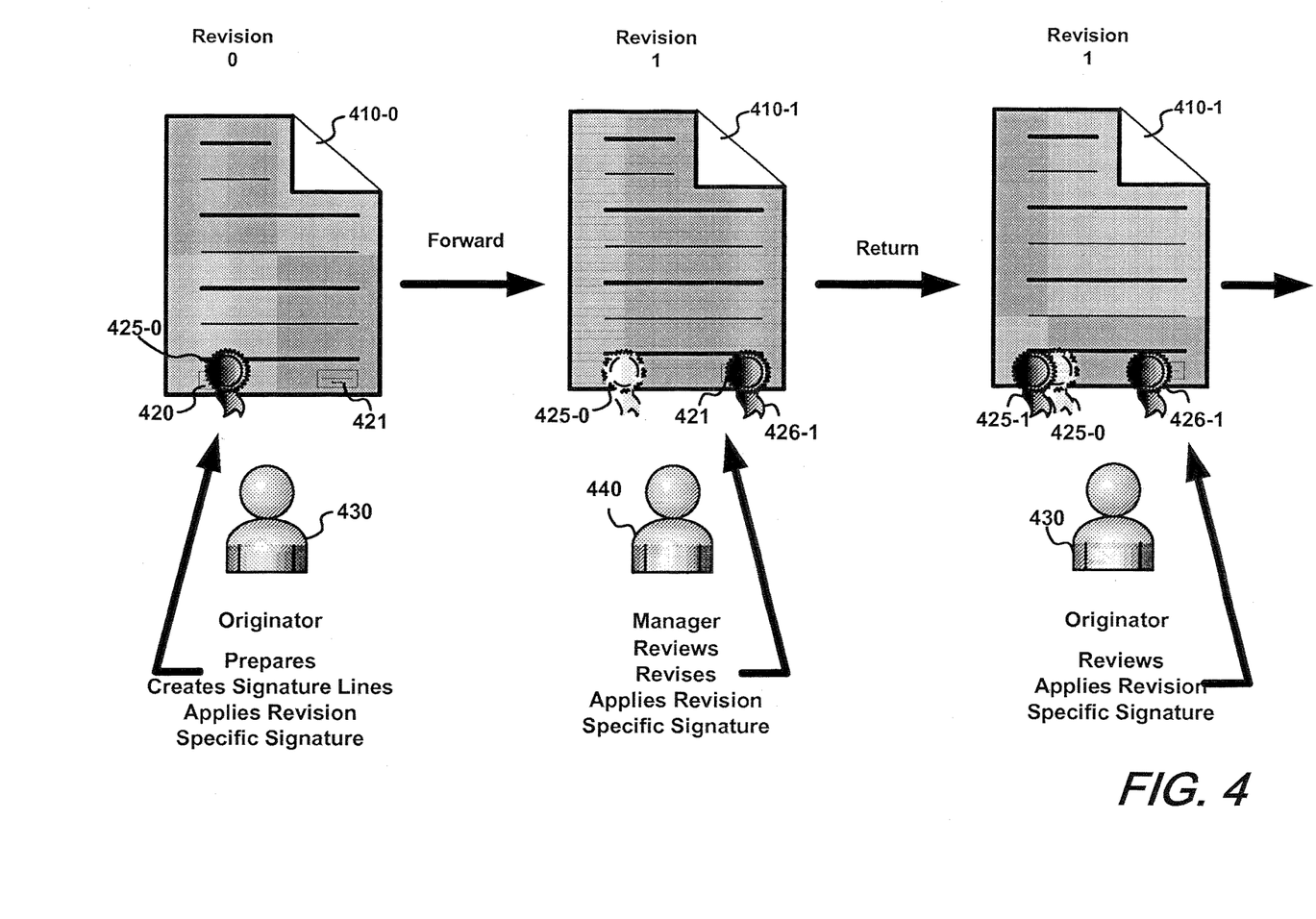
FIG. 4 is a schematic diagram depicting the application of a number of revision specific electronic signatures to an electronically stored document according to an aspect of the present disclosure.

Turning now to FIG. 4, there is shown an additional example of an electronically stored document having revision specific electronic signatures applied thereto according to yet another aspect of the present disclosure.

In this particular example, the electronically stored document 410-0 is depicted as being initially prepared by individual 430 and includes a number of signature lines 420 and 421 for signing by the individual 430 and her manager 440. After initial preparation by individual 430, the electronically stored document 410-0 is at revision level 0.

In this example shown in FIG. 4, the individual 430 prepares the electronically stored document 410-0 at revision 0, and applies her revision-specific electronic signature 425-0 to the signature line 420. The electronically signed, electronically stored document 410-0 is then forwarded to her manager 440 for review and signature.

Upon review of the electronically signed, electronically stored document 410-0 the manager 440 notices a number of changes that must be made to the electronically stored document 410-0. Advantageously, and according to an aspect of the present disclosure, the manager 440 makes any necessary changes to the electronically stored document 410-0, thereby producing a revision 1 electronically stored document 410-1. The manager then electronically signs revision 1 of the electronically stored document 410-1 with his electronic signature 426-1.

As previously noted and according to an aspect of the present disclosure, once a later revision is made to an electronically signed, electronically stored document, any previously applied electronic signatures are no longer effective/applicable for that later revision. With respect to the present Example 2 depicted in FIG. 4, the manager's electronic signature 426-1 is effective for this revision 1 of the electronically stored document 410-1, while the originator's revision 0 electronic signature 425-0, is not.

Accordingly, and while not specifically depicted in FIG. 4, any of a variety of visual indicators may be used to visually identify the effectiveness of an applied electronic signature. For example, an electronic signature that is no longer effective may be shown as "greyed", or "dotted", or "ghosted" or "blinking" or a combination thereof or other visual indicators.

Returning now to our discussion of FIG. 4 and the Example depicted therein, after manager 440 applies his revision specific electronic signature 426-1 to revision 1 electronically stored document 410-1, it is then returned to originator 430 for review and approval. Accordingly, once originator 430 reviews and approves this revision 1 electronically stored document 410-1, she applies her revision specific electronic signature 425-1 to the document 410-1. She may then forward it (or not) as her needs dictate. It is noted that according to an aspect of the present disclosure, electronically stored documents may advantageously be viewed by one or more users in a viewing mode that shows/highlights changes/markup. In this manner, any differences in the electronically stored document between revisions may be highlighted or otherwise identified to aid a user in review. Accordingly, a subsequent reviewing user may observe/review only those portions of an electronically stored document which has changed from a previous revision(s) and then apply an electronic signature, as appropriate.

At this point it should be apparent to those skilled in the art that the application of revision specific electronic signatures such as those depicted in this Example 2 may advantageously eliminate redundant reviews of electronically stored documents. For example, after the originator 430 applied revision specific electronic signature 425-1 to revision 1 of the electronically stored document 410-1, it did not have to return to the manager 440 for review and approval.

Example 3

Figure 5:
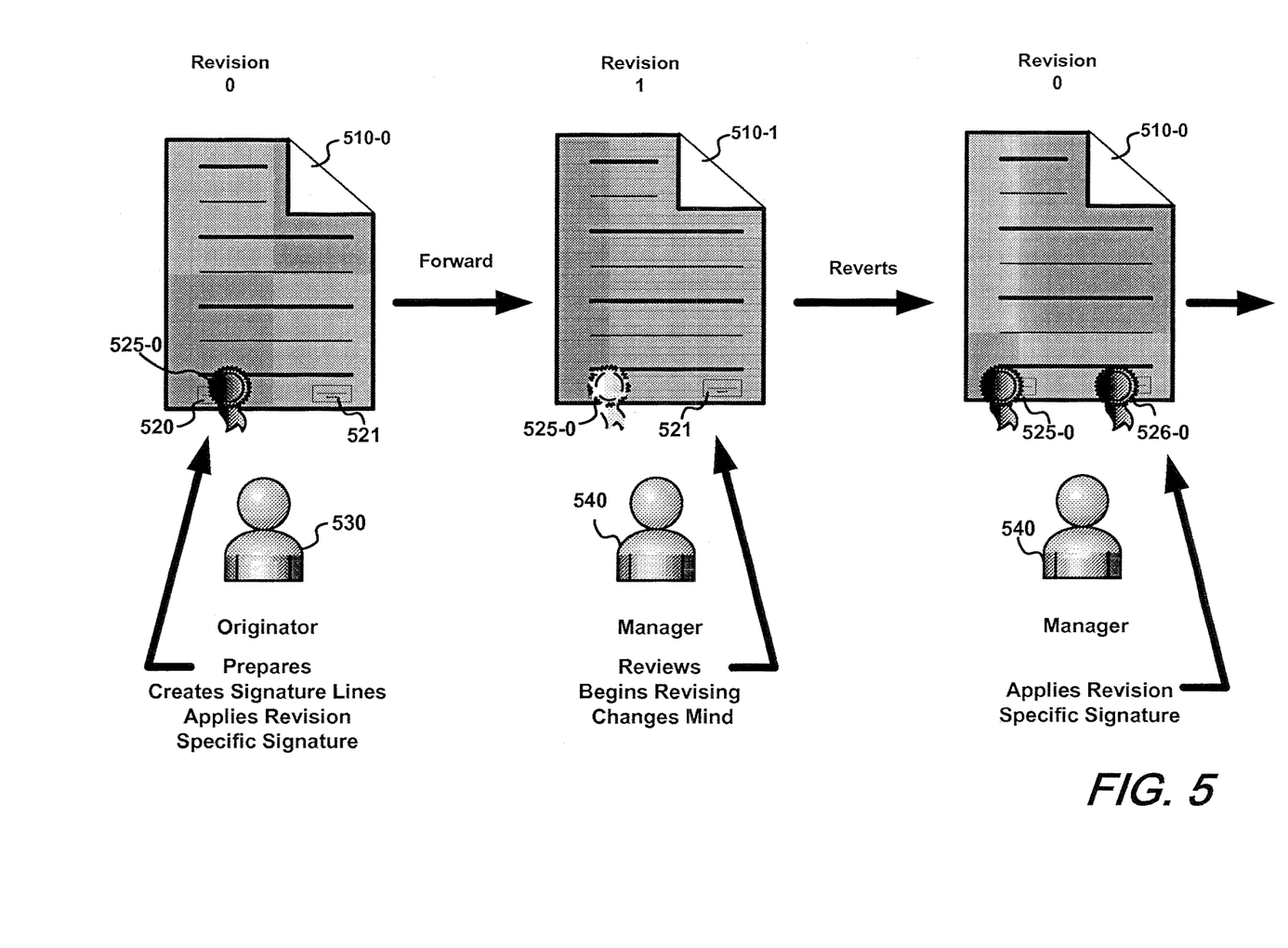
FIG. 5 is a schematic diagram depicting the application of a number of revision specific electronic signatures to an electronically stored document according to an aspect of the present disclosure.

With reference now to FIG. 5, there is shown an additional example of an electronically stored document having revision specific electronic signatures applied thereto according to yet another aspect of the present disclosure.

In this particular example, the electronically stored document 510-0 is depicted as being initially prepared by individual 530 and includes a number of signature lines 520 and 521 for signing by the individual 530 and her manager 540. After initial preparation by individual 530, the electronically stored document 510-0 is at revision level 0.

In this example shown in FIG. 5, the individual 530 prepares the electronically stored document 510-0 at revision level 0, and applies her revision-specific electronic signature 525-0 to the signature line 520. The electronically signed, electronically stored document is then forwarded to her manager 540 for review and signature.

Upon review of the electronically signed, electronically stored document 510-0 the manager 540 begins making a number of changes to the electronically stored document 510-0. As noted previously, upon making the changes the electronically stored document proceeds to a revision level 1, and as such the previously applied revision specific electronic signature 525-0 applied by originating individual 530 is no longer effective for the revision level 1.

Notwithstanding these initial changes, the manager 540 reconsiders his changes and subsequently changes the electronically stored document back to its revision level 0. According to an aspect of the present disclosure, the previously applied revision level 0 signature 525-0 applied by originating individual 530 is once again effective. Consequently, the manager 540 now applies his revision specific electronic signature 526-0 to this revision 0 document 510-0 and forwards it—or not—as appropriate. The resulting electronically stored document depicted in this example is a revision 0 electronically stored document having two effective, revision-specific electronic signatures applied thereto namely, 525-0, and 526-0.

At this point we note that an additional aspect of revision-specific electronic signatures as applied to electronically stored documents according to another aspect of the present disclosure. More particularly, it is noted that when a revision specific electronic signature such as 525-0 is applied to an electronically stored document 510-0, it may advantageously be marked or otherwise identified as having a period of time during which it remains effective. That is to say, an electronic signature such as 525-0 may become "stale" upon the expiration of a pre-determined period of time after which the signature is determined to be "stale" and therefore no longer effective. Advantageously, such an expiration period may be set to any of a variety of user definable periods, namely, hours, days, weeks, etc. In this manner, once an electronic signature is applied to an electronically stored document, subsequent reviewers may be "urged" to expeditiously complete their review/execution before previously applied signatures expire. Notably, and according to another aspect of the present disclosure, upon the application of all required electronic signatures any pre-determined expiration periods are disabled. In other words, if all required subsequent electronic signatures are applied before the expiration of the pre-determined period of time for a previously applied electronic signature, then the expiration period for the previously applied electronic signature is disabled and the period of time is effectively an indefinite one and the signatures will always be valid and effective.

Notably, color or other visual indicator may be used to indicate whether or not a particular signature is effective and/or whether it is becoming stale. More particularly, and by way of example only and in no way limiting, a valid electronic signature that either does not expire or is not within a pre-determined period of expiring, may be displayed as green. Similarly, an expired, stale, or otherwise invalid or ineffective electronic signature may be displayed in red. Finally, an electronic signature that is within a pre-determined period of expiring or becoming stale may be displayed in yellow. Those skilled in the art will appreciate that other visual indicators are contemplated as well.

Figure 6A:
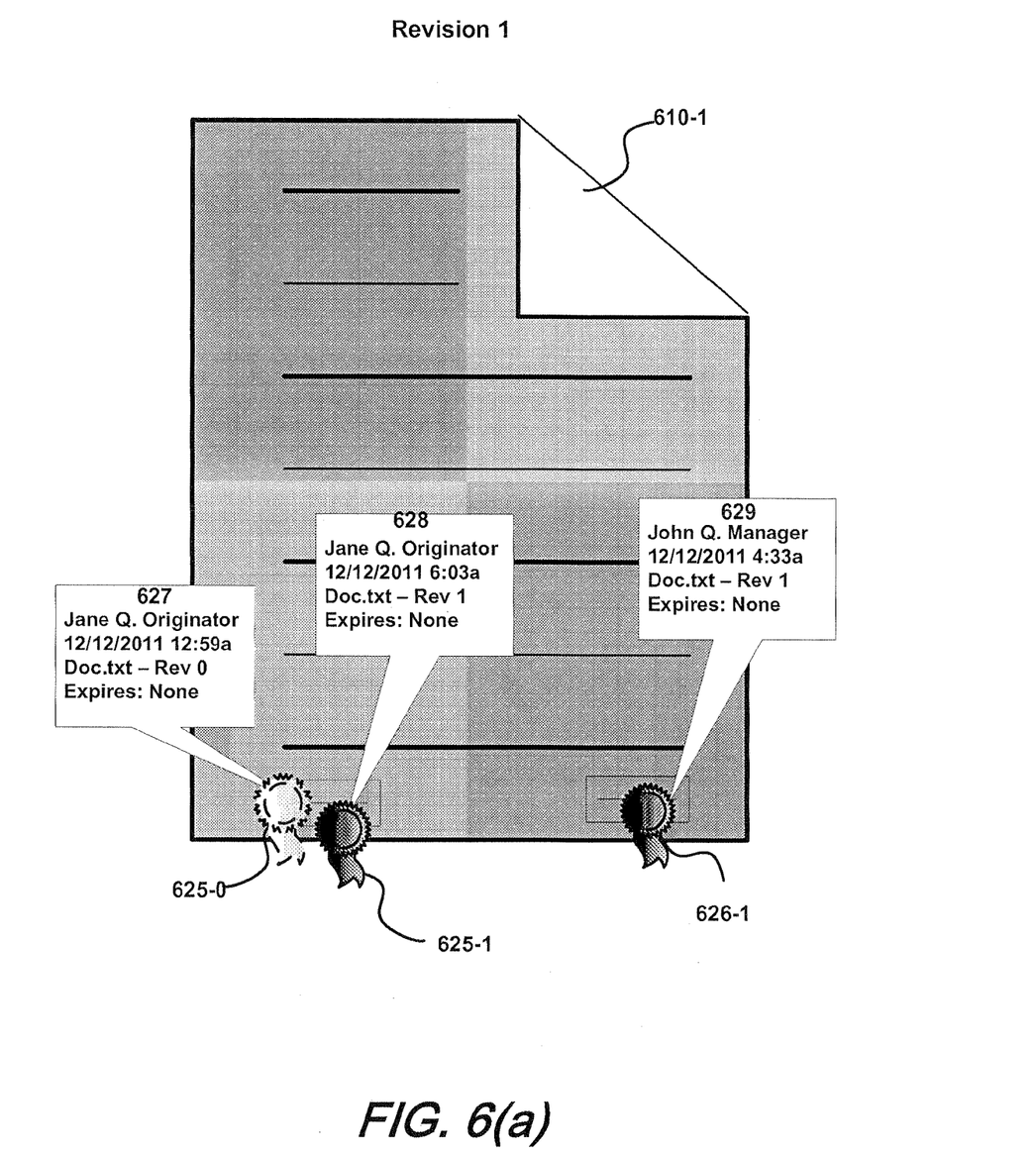

FIG. 6(a) depicts a schematic illustration of an electronically stored document at a revision level 1 600-1, having a number of revision specific electronic signatures attached thereto 625-0, 625-1, 626-1. Since the electronically stored document 600-1 is at revision level 1 in this illustration, the revision 0 specific electronic signature 625-0 is shown as behind the revision 1 specific electronic signature 625-1. Those skilled in the art will appreciate that this depiction is merely one illustrative example of how such multiple revision-specific electronic signatures may be depicted for an individual signor or generally.

Shown further in this FIG. 6(a), are several "callouts" or "balloons" 627, 628, and 629 which may result for example, when a cursor or other user input structure is hovered over the particular electronic signature. Alternatively, such callouts may be invoked by touching a touch sensitive display device. As shown in this example, the callouts 627, 628, 629 provide information about the particular electronic signature 625-0, 625-1, and 626-1 to which they are associated.

For example, the callout associated with revision specific signature 625-0, namely 627, indicates the person who applied the signature, the date, time, document and revision number of the document. Likewise, similar information is viewable from callouts associated with later revision specific signatures 625-1, 626-1, namely, 628 and 629.

Those skilled in the art will appreciate that revision specific information (shown in callouts 627, 628, and 629) associated with each of the revision specific electronic signatures 625-0, 625-1, 626-1 depicted in this FIG. 6(a) are not necessarily "attached" to or "carried" by the electronic signatures themselves. In this regard, a specific electronically stored document may advantageously maintain/store its revision information distinctly from information of the original document and associate a particular electronically stored document revision to a particular electronic signature. According to an aspect of the present disclosure then, an association is made between the revision level of the electronically stored document and a particular electronic signature and that association may be maintained/stored either by the electronically stored document itself, the electronic signature, or another electronically-stored structure.

Figure 6B:
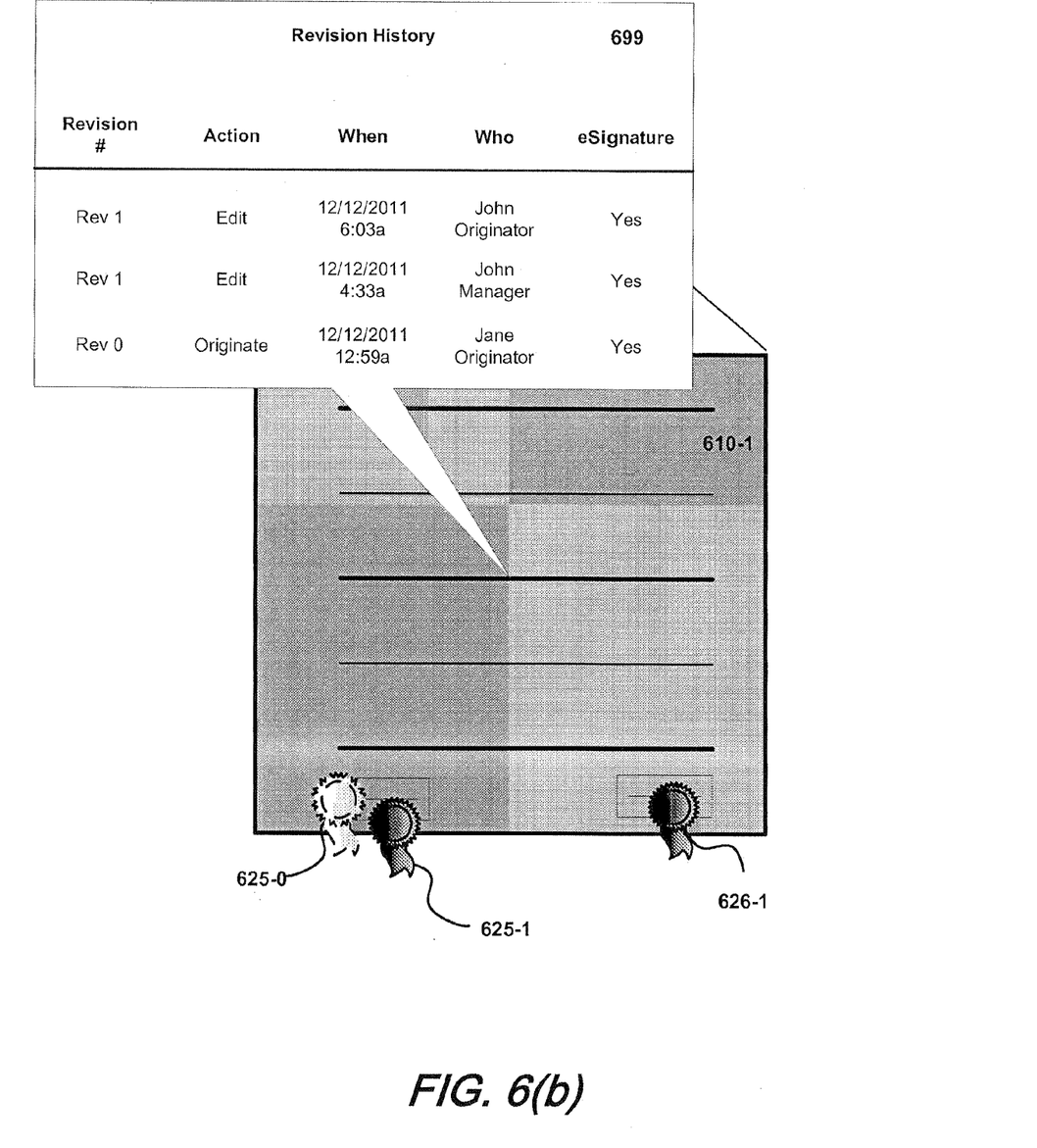

With reference now to FIG. 6(b) there is shown the electronically stored document 610-1 depicted in FIG. 6(a) where the revision history is viewed as a callout 699 in tabular form. As may be appreciated by those skilled in the art, a right-click or other enabling action may advantageously invoke such callout 699 which—by way of example only—displays the revision number, action taken, when taken, by who taken, and whether or not an electronic signature was applied. In this manner, subsequent reviewers can quickly and effectively assess a present status of the electronically stored document and in particular with respect to any electronic signatures.

With these aspects in mind, we now disclose an exemplary scenario for attaching a revision-specific electronic signature to an electronically stored document. Of particular interest and according to yet another aspect of the present disclosure, revision specific electronic signatures may be applied to electronically stored documents via local devices, i.e., personal computers, laptop computers, personal digital assistants (PDAs), smartphones, tablet computers and the like, as well as via networks or via clouds.

Figure 7:
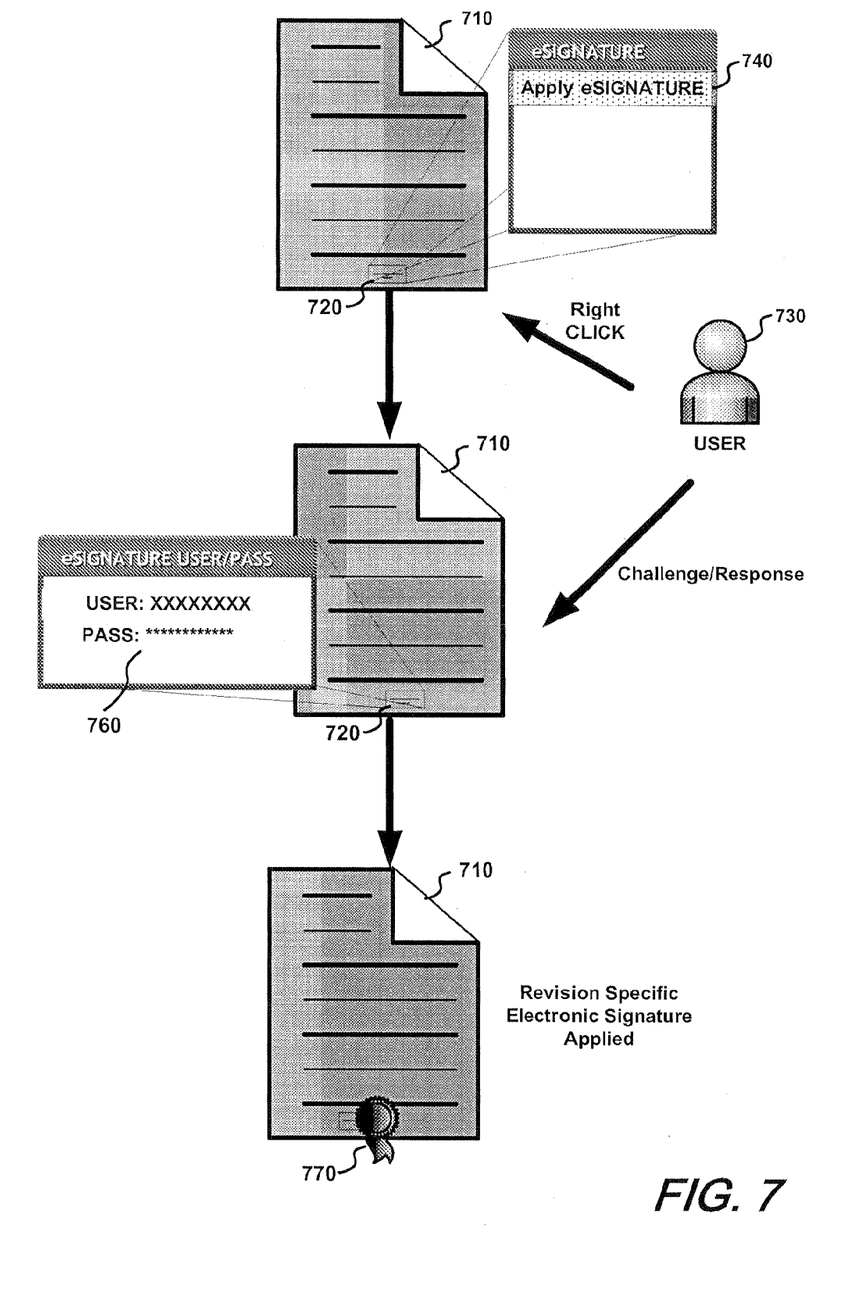
FIG. 7 is a schematic diagram depicting an exemplary user interface interaction to apply a revision specific electronic signature to an electronically stored document according to an aspect of the present disclosure.

With reference now to FIG. 7, there is shown a series of illustrations depicting one of many possible ways in which revision specific electronic signatures may be applied to an electronically stored document. As depicted in that FIG. 7, an electronically stored document 710 is shown as having a signature line 720.

A user 730 may then "right click" or otherwise indicate that a revision specific electronic signature is to be applied 740 producing a challenge dialogue box 750 into which the user 730 inputs a password 760 or other response to the challenge. If the response 760 is acceptable according to some predetermined standard, then the revision specific electronic signature 770 is applied to the electronically stored document 710. Advantageously, and as may be readily appreciated by those skilled in the art, the challenge 760 presented to the user 730 may require a username or other indicia of user as well. Notably, such user authentication may be provided by any of a number of known methods and input devices including keystroke, mouse input, biometric, fingerprint, RFID, smartcard and the like.

Alternatively, it is noted that in certain situations a user 730 may be preparing the electronically stored document 710 within a network or cloud computing environment (not specifically shown). In such a circumstance, and as can be readily appreciated by those skilled in the art, a challenge (i.e user-name/password) or other authentication scheme (i.e., challenge, biometric, etc.) may have been employed to permit the user 730 to access the network and/or cloud.

Advantageously, and according to yet another aspect of the present disclosure, where a user 730 has already provided sufficient authentication (logged-in-credentials) then applying the electronic signature 770 may not require an additional challenge such as that shown in FIG. 7. In such a situation, the user may just right-click or otherwise indicate the application of an electronic signature for example, via a check-box, a menu, a dialogue box, a checkbox, pushbutton, radiobutton, etc. Notwithstanding this aspect however, additional security characteristics may be achieved through the use of the challenges/passwords described herein, prior to applying an electronic signature and particular implementations may benefit from such characteristics. Accordingly, the present disclosure is not limited to a particular user authentication/credential scheme.

Advantageously, an electronically stored document 710 such as that depicted in FIG. 7 may be stored locally or remotely in a network or cloud. Similarly, any revision specific electronic signatures may be likewise stored and subsequently applied as individual users require.

Figure 8:
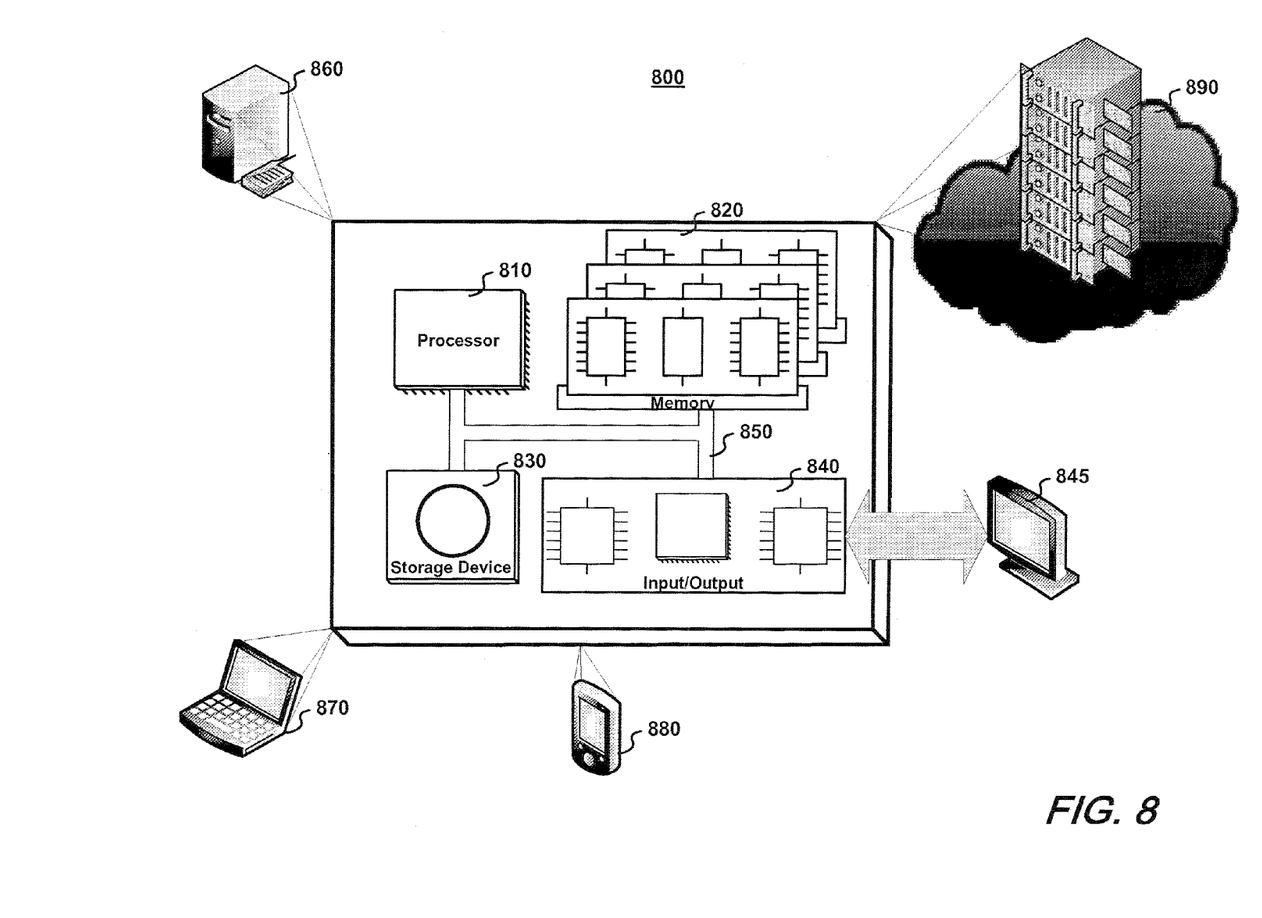
FIG. 8 is a schematic diagram depicting a representative computer system for implementing and exemplary methods and systems for applying revision specific electronic signatures to an electronically stored document according to an aspect of the present disclosure.

FIG. 8 shows an illustrative computer system 800 suitable for implementing methods and systems according to an aspect of the present disclosure. The computer system may comprise, for example a computer running any of a number of operating systems. The above-described methods of the present disclosure may be implemented on the computer system 800 as stored program control instructions.

Computer system 800 includes processor 810, memory 820, storage device 830, and input/output structure 840. One or more input/output devices may include a display 845. One or more busses 850 typically interconnect the components, 810, 820, 830, and 840. Processor 810 may be a single or multi core.

Processor 810 executes instructions in which embodiments of the present disclosure may comprise steps described in one or more of the Figures. Such instructions may be stored in memory 820 or storage device 830. Data and/or information may be received and output using one or more input/output devices.

Memory 820 may store data and may be a computer-readable medium, such as volatile or non-volatile memory. Storage device 830 may provide storage for system 800 including for example, the previously described methods. In various aspects, storage device 830 may be a flash memory device, a disk drive, an optical disk device, or a tape device employing magnetic, optical, or other recording technologies.

Input/output structures 840 may provide input/output operations for system 800. Input/output devices utilizing these structures may include, for example, keyboards, displays 845, pointing devices, and microphones—among others. As shown and may be readily appreciated by those skilled in the art, computer system 800 for use with the present disclosure may be implemented in a desktop computer package 860, a laptop computer 870, a hand-held computer, for example a tablet computer, personal digital assistant or smartphone 880, or one or more server computers which may advantageously comprise a "cloud" computer 890.

At this point, while we have discussed and described the invention using some specific examples, those skilled in the art will recognize that our teachings are not so limited. Accordingly, the invention should be only limited by the scope of the claims attached hereto.

The invention claimed is:

1. A computer-implemented method for electronically signing an electronically stored document comprising the steps of:
   applying, by one or more processors, a first electronic signature to the electronically stored document to produce an initial signed version of the electronically stored document, wherein the first electronic signature includes information that associates the first electronic signature with the initial signed version of the electronically stored document;
   subsequent to applying the first electronic signature to the electronically stored document, modifying, by the one or more processors, the initial signed version of the electronically stored document thereby producing a first revision of the electronically stored document;

applying, by the one or more processors, a second electronic signature to the first revision of the electronically stored document, wherein the second electronic signature includes information that associates the second electronic signature with the first revision of the electronically stored document, such that the first revision of the electronically stored document includes both the first electronic signature and the second electronic signature, and providing a user with the ability to view a revision history of the electronically stored document while viewing the electronically stored document, wherein the first electronic signature expires after a pre-determined period of time, and wherein the electronically stored document is simultaneously accessed by a first user associated with the first electronic signature and a second user associated with the second electronic signature.

2. The method of claim 1 wherein the electronically stored document is a shared document among a number of different users.

3. The method of claim 1 wherein the first electronic signature is revoked upon modifying the electronically stored document.

4. The method of claim 1 wherein the first electronic signature and the second electronic signature are each associated with the same person.

5. The method of claim 1 wherein the electronic signatures are user-selectable indicia.

6. The method of claim 1 wherein the electronic signatures are applied through the effect of a selector mechanism chosen from the group consisting of: checkbox, menu, dialogue box, pushbutton, and radiobutton.

7. A computer-implemented system for electronically signing an electronically stored document that is accessible by the system, the system comprising:

one or more processors; and one or more memory devices for storing program instructions, wherein the program instructions, when executed by the one or more processors, cause the one or more processors to:

apply a first electronic signature to the electronically stored document to produce an initial signed version of the electronically stored document, wherein the first electronic signature includes information that associates the first electronic signature with the initial signed version of the electronically stored document, subsequent to application of the first electronic signature to the electronically stored document, modify the initial signed version of the electronically stored document thereby producing a first revision of the electronically stored document, apply a second electronic signature to the first revision of the electronically stored document, wherein the second electronic signature includes information that associates the second electronic signature with the first revision of the electronically stored document, such that the first revision of the electronically stored document includes both the first electronic signature and the second electronic signature, and provide a user with the ability to view a revision history of the electronically stored document while viewing the electronically stored document, wherein the program instructions further cause the one or more processors to effect the expiration of the first electronic signature after a pre-determined period of time, wherein the program instructions further cause the one or more processors provide simultaneous access to the electronically stored document by a first user associated with the first electronic signature and a second user associated with the second electronic signature.

8. The computer implemented system of claim 7, wherein the program instructions further cause the one or more processors to share the electronically stored document among a number of different users.

9. The computer implemented system of claim 7, wherein the program instructions further cause the one or more processors to revoke the first electronic signature upon modification of the electronically stored document.

10. The computer implemented system of claim 7 wherein the first electronic signature and the second electronic signature are each associated with the same person.

11. The computer implemented system of claim 7, wherein the program instructions further cause the one or more processors to apply the electronic signatures through the effect of a selector mechanism chosen from the group consisting of: checkbox, menu, dialogue box, pushbutton, radiobutton.

12. A non-transitory computer storage medium having computer executable instructions which when executed by a computer cause the computer to perform operations comprising:

applying, by one or more processors, a first electronic signature to an electronically stored document to produce an initial signed version of the electronically stored document, wherein the first electronic signature includes information that associates the first electronic signature with the initial signed version of the electronically stored document;

subsequent to applying the first electronic signature to the electronically stored document, modifying, by the one or more processors, the initial signed version of the electronically stored document thereby producing a first revision of the electronically stored document;

applying a second electronic signature to the first revision of the electronically stored document, wherein the second electronic signature includes information that associates the second electronic signature with the first revision of the electronically stored document, such that the first revision of the electronically stored document includes both the first electronic signature and the second electronic signature, and providing a user with the ability to view a revision history of the electronically stored document while viewing the electronically stored document, wherein the first electronic signature expires after a pre-determined period of time, and wherein the electronically stored document is simultaneously accessed by a first user associated with the first electronic signature and a second user associated with the second electronic signature.

* * * * *